United States Patent [19]

Harvey et al.

[11] Patent Number: 4,662,657
[45] Date of Patent: May 5, 1987

[54] FLOW SYSTEM

[75] Inventors: Andrew C. Harvey, Waltham; Brian J. Doherty, Marblehead, both of Mass.

[73] Assignee: Foster-Miller, Inc., Waltham, Mass.

[21] Appl. No.: 771,367

[22] Filed: Aug. 30, 1985

[51] Int. Cl.⁴ .............................................. F16L 39/00
[52] U.S. Cl. ..................................... 285/96; 285/106; 285/136; 277/27; 277/188 A; 277/236
[58] Field of Search ................... 137/615; 285/96, 98, 285/106, 136, 190, 281; 277/3, 25, 27, 188 R, 188 A, 236

[56] References Cited

U.S. PATENT DOCUMENTS

| | | | |
|---|---|---|---|
| 2,997,057 | 8/1961 | Toth | 137/614.11 X |
| 3,002,769 | 10/1961 | Deubler . | |
| 3,011,803 | 12/1961 | Buchner et al. | 277/188 A X |
| 3,119,623 | 1/1964 | Sherchenko | 277/27 X |
| 3,351,360 | 11/1967 | Faccou | 285/136 X |
| 3,606,397 | 9/1969 | Flory . | |
| 3,838,718 | 10/1974 | Flory . | |
| 3,944,263 | 3/1976 | Arnold | 285/106 X |
| 4,111,467 | 9/1978 | de Fremery . | |
| 4,126,336 | 11/1978 | Ortloff . | |
| 4,201,392 | 5/1980 | Watts | 277/188 R X |
| 4,250,918 | 2/1981 | Tuson . | |
| 4,258,902 | 3/1981 | Liebert et al. | 277/188 R |
| 4,288,106 | 9/1981 | Foolen . | |
| 4,289,264 | 9/1981 | Rawlins | 277/27 |
| 4,391,298 | 7/1983 | Ortloff . | |
| 4,405,162 | 9/1983 | Williams . | |
| 4,408,765 | 10/1983 | Adelmann . | |
| 4,408,766 | 10/1983 | Paech . | |
| 4,411,434 | 10/1983 | Lewis . | |
| 4,487,435 | 12/1984 | Yamatani | 289/98 X |
| 4,504,069 | 3/1985 | Stenhard | 277/27 X |
| 4,511,149 | 4/1985 | Wiese | 277/27 X |
| 4,552,368 | 11/1985 | Wallace | 277/27 |
| 4,555,118 | 11/1985 | Saliger | 277/188 R |

Primary Examiner—A. Michael Chambers
Assistant Examiner—John C. Fox

[57] ABSTRACT

A fluid swivel system of the type suitable for use with a single point mooring system and the like includes mandrel structure that defines a through flow path from a coupling to a port in an outer cylindrical interface surface, a port in the outer interface surface. Generally toroidal structure surrounds and is mounted for rotation relative to the mandrel structure, the toroid structure having an inner cylindrical interface surface in juxtaposed relation to the interface surface of the mandrel structure. The mandrel and toroid structures cooperate to define a through flow passage between the mandrel coupling and a toroid port in the external surface of the swivel and further cooperate to define an annular seal chamber between the juxtaposed interface surfaces on either side of the through passage. Metal seal ring structure is disposed in each seal chamber, each seal ring structure having first and second sealing surfaces for engaging corresponding seal chamber defining surfaces of the mandrel and toroid structures respectively, and each sealing surface has relatively hard and soft portions. Bearing structure between the mandrel and toroid structures is located so that each seal chamber is between the adjacent bearing structure and the through passage.

22 Claims, 7 Drawing Figures

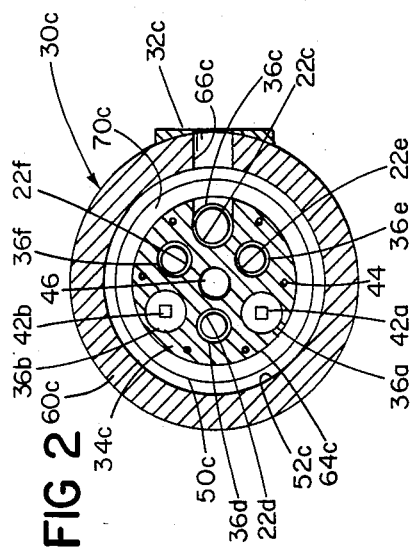
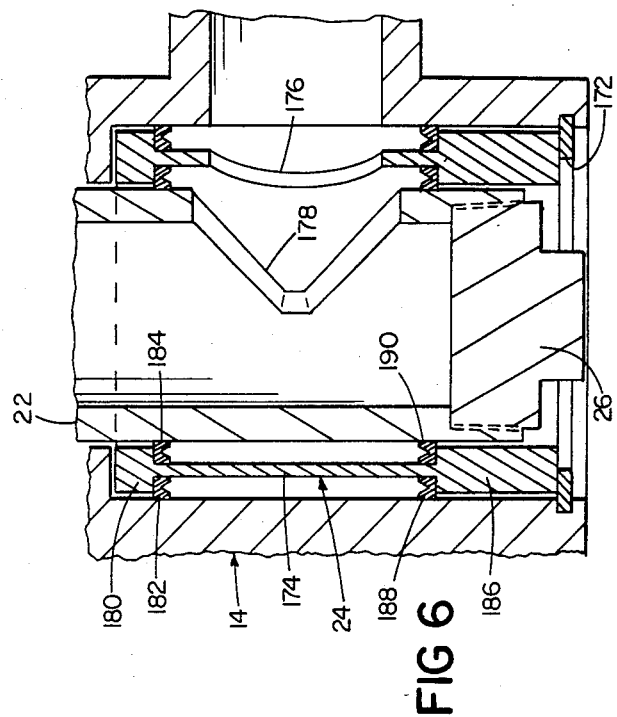
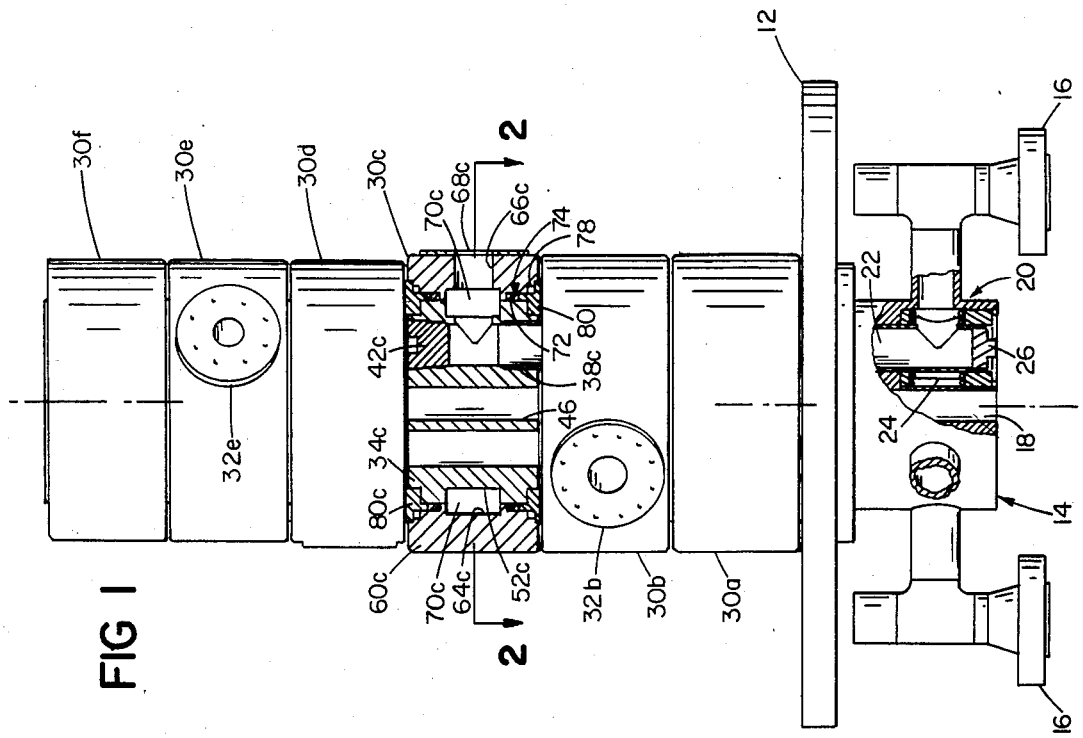

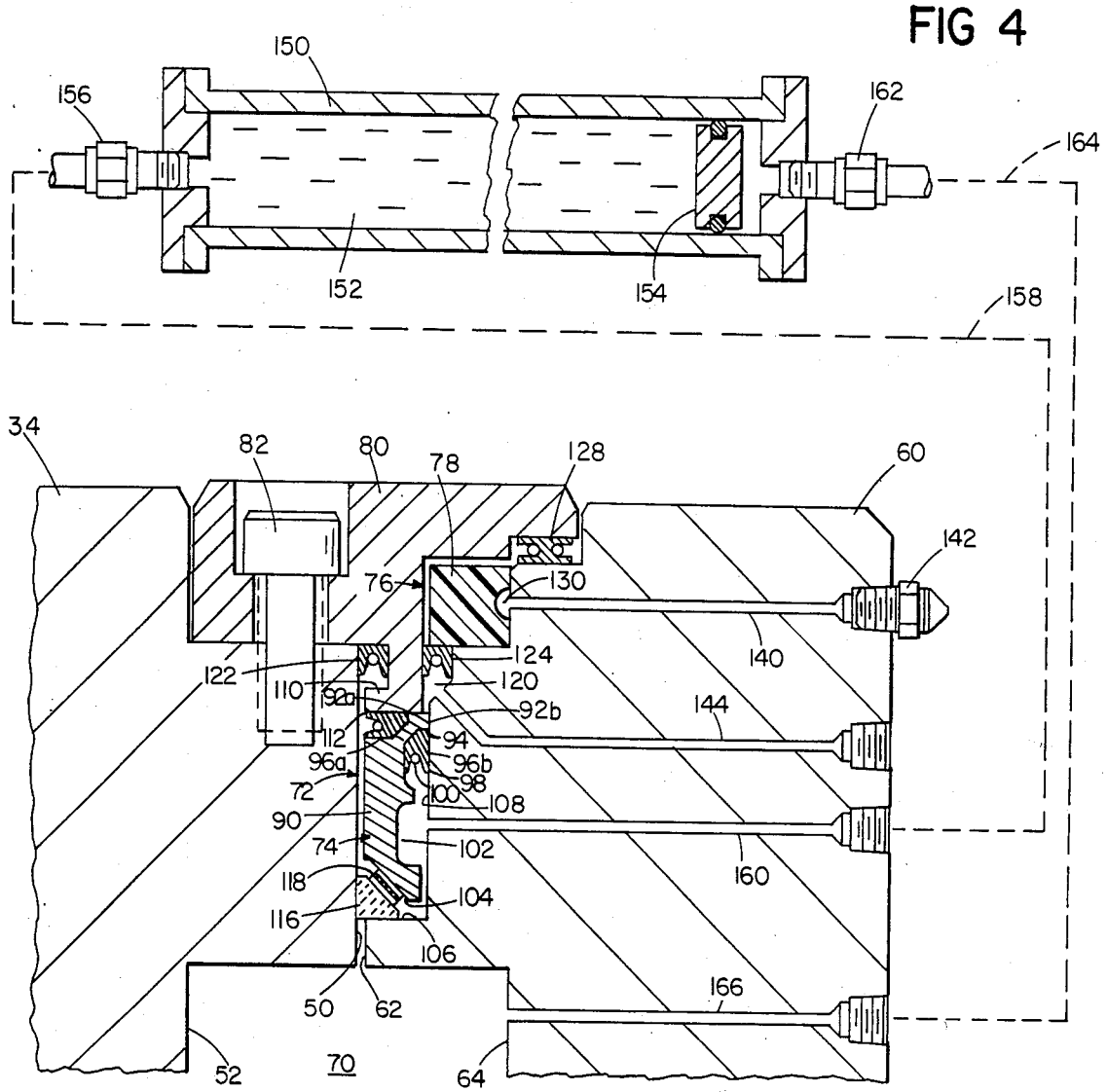
FIG 4
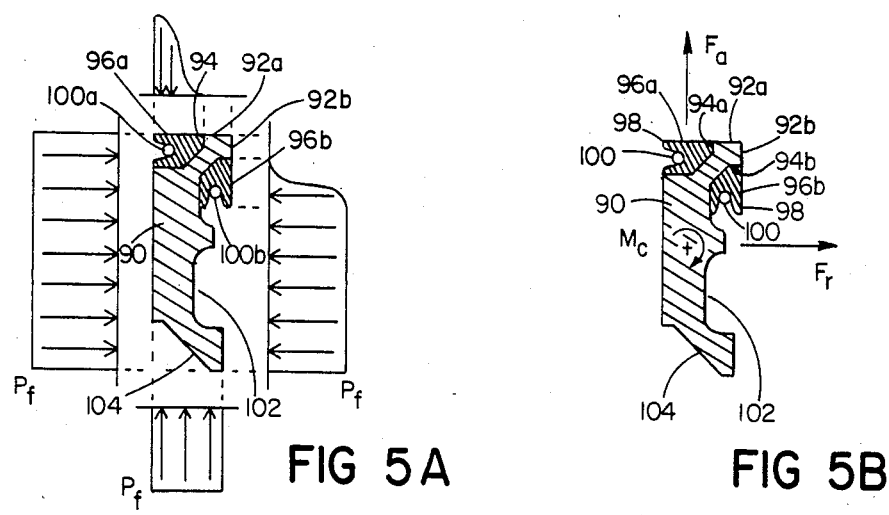
FIG 5A
FIG 5B

FLOW SYSTEM

This invention relates to flow systems and more particularly to arrangements for sealing junctions between relatively movable components that define flow paths in such flow systems, and to fully rotatable fluid swivels of the type suitable for use with single point mooring systems and the like.

A fluid swivel flow system of the type used in a single point mooring system for transferring crude oil to and from a tanker, the single point mooring system permitting the tanker to be moored by bow hawsers to a single point such as a buoy in a deep water location sufficient to accommodate the draft of a tanker and the swivel allowing the tanker to rotate about the buoy while product is being transferred to or from the tanker, has two relatively movable members with seal and bearing components that are vulnerable to failure. Frequently, it is desirable to transfer simultaneously several products or to deballast the tanker while a product is being loaded. Fluids flowed through such swivels may be at pressures of up to 5,000 psi and above and at temperatures of at least up to 125° C. through pipes of fifteen centimeter diameter and greater. The transferred fluids may include erosive agents such as sand as well as corrosive agents, and the flow system may be in an ocean location where maintenance is difficult. The bearing and seal components of such a swivel must function in the presence of unusually large clearance gaps (and gap variations) due to the large diameter flow paths and the presence of hot product which require additional clearance to allow for differential thermal expansion. In addition, the bearings and seals are subject to other demanding conditions such as intermittent bidirectional rotation, variable normal loading and overturning moments, high pressure differentials, proximity to corrosive and abrasive fluids, and extended exposure to the offshore environment.

In accordance with one aspect of the invention there is provided a flow system with a flow path defined in part by two relatively movable structures with juxtaposed interface surfaces in which ports are defined through which the flow path extends. An annular seal chamber is defined between the interface surfaces of the two relatively movable structures, and annular seal ring structure in the seal chamber has a first sealing surface for engaging a seal chamber defining surface of one structure and a second sealing surface adjacent the first sealing surface for engaging a seal chamber defining surface of the second structure, together with supplemental seal material of more compliant material than the first and second sealing surfaces of the seal ring as an extension of each sealing surface. The first and second sealing surfaces resist extrusion or deformation at the contact interface and the compliant supplemental seals conform to the micro-roughness of the interface and prevent leakage. Preferably, the first and second sealing surfaces of the seal ring structure each has a hardness of at least about 50 Rockwell$_c$ and each supplemental seal material has a hardness of less than about 90 Rockwell$_h$. Pressure equalizing means is provided for maintaining the pressure in the seal chamber at substantially the same pressure as in the through flow passage and the seal ring structure is arranged so that the pressure in the seal chamber acts to urge the sealing surfaces of the seal ring structure into sealing engagement with the cooperating seal chamber defining surfaces of the two relatively movable flow path defining structures.

In accordance with another aspect of the invention, there is provided a fluid swivel system of the type suitable for use with a single point mooring system and the like that includes mandrel structure with a coupling for connection to a flow conduit, an outer cylindrical interface surface, a port in the outer interface surface, and that defines a through flow path from the coupling to the port. Generally toroidal structure surrounds and is mounted for rotation relative to the mandrel structure, the toroid structure having an inner cylindrical interface surface in juxtaposed relation to the interface surface of the mandrel structure and defining a through flow path from a port in its inner interface surface to a port in an external surface. The mandrel and toroid structures cooperate to define a through flow passage between the mandrel coupling and the toroid port in the external surface of the swivel and further cooperate to define an annular seal chamber between the juxtaposed interface surfaces on either side of the through passage. Metal seal ring structure is disposed in each seal chamber, each seal ring structure having first and second sealing surfaces for engaging corresponding seal chamber defining surfaces of the mandrel and toroid structures respectively, and each sealing surface has relatively hard and soft portions. Pressure equalizing means is coupled between the through flow passage of the swivel and each seal chamber for maintaining the pressure in the seal chambers substantially at the same pressure as in the through flow passage to urge the sealing surfaces of the metal seal ring structures into sealing engagement with the seal chamber defining surfaces of the mandrel and toroid structures. Bearing structure between the mandrel and toroid structures facilitates rotation of the toroid structure relative to the mandrel structure, the bearing structure being located so that each seal chamber is between the adjacent bearing structure and the through passage.

In a particular embodiment, the main sealing surfaces of each seal ring structure are orthogonally disposed and each supplemental seal material of more compliant material is a seal member of the C-section type that has a sealing surface aligned with an immediately adjacent main metallic sealing suface and resilient means that urges the supplemental seal into contact with both the seal ring and a seal chamber surface. The pressure equalizing means includes grease filled cylinder means coupled between the flow path and each seal chamber for pressurizing the seal chambers to seat the seal ring sealing surfaces against the seal chamber surfaces to seal the interface between the relatively rotatable mandrel and toroid structures. Second annular seal ring structure in each seal chamber has sealing surfaces for engaging seal chamber defining surfaces adjacent interface surfaces of the mandrel and toroid structures that are proximate to the flow path so that each second annular seal ring structure is pressure balanced and insures against random intrusion of contaminants into the seal chamber through the gap between the interface surfaces of the mandrel and toroid structures. Resilient biasing structure between the two annular seal ring structures in each seal chamber is effective to bias the metallic sealing surfaces into sealing engagement with said cooperating seal chamber defining surfaces. The material pair of each metallic sealing surface of the annular seal ring structure and the engaged surface of the seal chamber defining surface is such that the harder material is on the seal chamber defining surface and the softer material is on the sealing surfaces of the annular seal ring structure, the material pair having sliding characteristics so that wear of the softer seal ring surfaces will be relatively low. Slider bearing structure of polymeric material that supports the relatively rotatable mandrel and toroid structures is located so that each seal chamber is between the bearing structure and the flow path. Each annular seal ring structure and its toroid structure have coooperating anti-rotation lug and slot structure so that the seal rings turn with and are allowed to move axially relative to the toroid. Conduit structure has an upper end secured to the mandrel and a lower end disposed in expansion joint structure so that the conduit structure is allowed to grow freely when heated, thus reducing thermal loading when said conduit is heated. In a swivel system, swivel modules are stacked and each of the mandrels has a conduit structure secured to it. The conduit structures pass through lower mandrel structures in the stack and there is air space between each conduit structure and said lower mandrel structures and between adjacent modules so that temperature gradients in said swivel modules are minimized.

Other features and advantages of the invention will be seen as the following description of a particular embodiment progresses, in conjunction with the drawing, in which:

FIG. 1 is an elevational view (partially in section) of a swivel system in accordance with the invention;

FIG. 2 is a sectional view taken along the line 2—2 of FIG. 1;

FIG. 4 is a sectional and diagrammatic view showing features of the seal and bearing assembly arrangements employed in the swivel module shown in FIG. 3;

FIGS. 5a and 5b are diagrammatic views illustrating loading and deflection of the seal ring in the swivel module; and FIG. 6 is a sectional view showing details of the expansion joint subassembly.

DESCRIPTION OF PARTICULAR EMBODIMENT

Figure 3:
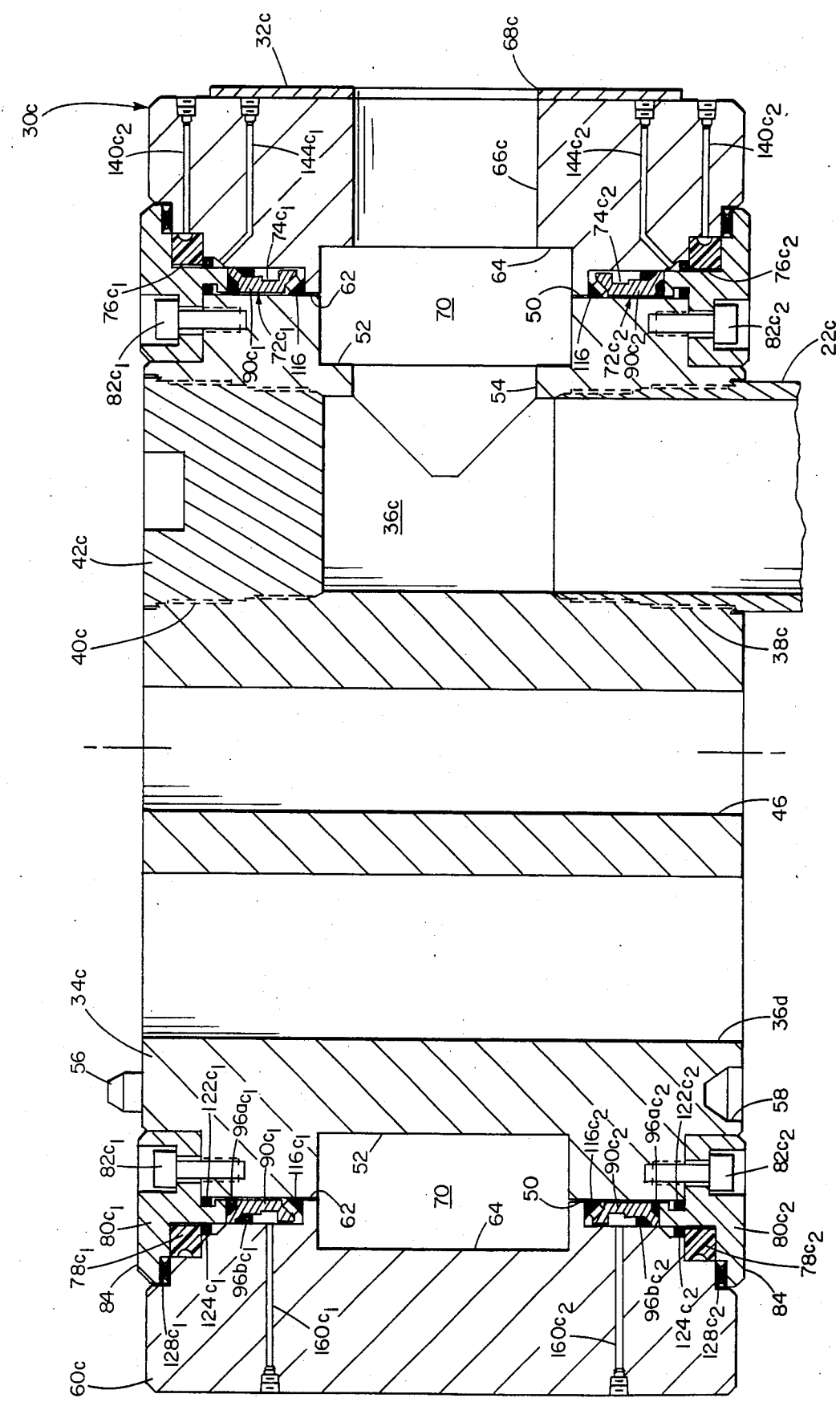
FIG. 3 is a sectional view of one of the swivel modules of the swivel system shown in FIG. 1.

The swivel system shown in FIG. 1 includes steel support plate 12 that is about two and one half meters in diameter and about twelve centimeters in thickness for mounting the swivel system on a nonrotating platform structure or the like. Secured to the lower side of support plate 12 is inlet assembly 14 that includes six inlet flanges 16 typically (for connection to corresponding submerged flow systems) and a central passage 18 for control cables and the like. Connected to each inlet flange assembly 16 is an expansion joint subassembly 20 that receives an oil field tubular 22, the lower end of which is received in lantern ring assembly 24 that has an end cap 26.

Stacked on support plate 12 is a series of six similar swivel modules 30, each of which is about one half meter in height and about 1.3 meters in outer diameter. Each module 30 has a coupling surface 32 for connection to a flange of compliant hose such as Coflexip pipe. Each of the three lower swivel modules (30a, 30b, 30c) provides a flow path of about twenty centimeters diameter and has a weight of about 5,000 kilograms, while each of the upper three swivel assemblies 30d, 30e, 30f provides a flow path of about fifteen centimeter diameter and has a weight of about 4,300 kilograms.

The multipath swivel assembly shown in FIG. 1 provides six fully rotatable swivels suitable for use with a single point mooring or rigid production yoke or turret with three twenty centimeter diameter flow lines for operation at pressures of up to 5,000 psi for produced fluids and water injection and three fifteen centimeter diameter flow lines for operation at pressures of up to 5,000 psi for gas injection, hydraulic supply, chemical injection and the like. The six flow paths are capable of handling fluids at temperatures of up to about 125° C. that contain erosive agents such as sand and corrosive agents such as hydrogen sulfide, carbon dioxide and salt water.

With reference to the sectioned portion of FIG. 1 and FIG. 2, each swivel module 30 includes mandrel member 34 of a duplex (ferritic/austenitic) stainless steel alloy that resists such corrosive and erosive agents. Formed in mandrel 34c are six through passages 36a-f for corresponding tubulars 22 a-f (there being only three through passages 36 in the smaller upper mandrels 34d, e and f), the diameters of through passages 36 being slightly larger than the outer diameters of tubulars 22 so that a dead air space is provided between each tubular 22 and its passage 36. Formed in each mandrel 34 is an appropriate oil field joint 38 (such as Hydril FJ-P) that secures the upper end of the corresponding tubular 22 to mandrel 34. A similar joint 40 at the upper end of that passage 36 receives plug 42. Mandrels 34 are secured in stacked relation of plate 12 by tie bolts 44 with central through passage 46 aligned with through passage 18 in inlet assembly 14.

Each mandrel 34 has an outer cylindrical interface surface 50 in which is formed an annular recess 52 that is connected to the plugged passage 36 by transition passage 54. Cooperating pins 56 and sockets 58 (FIG. 3) provide alignment of the mandrels 34 in stacked relation for securing with tie bolts 44.

Surrounding each mandrel 34 is a toroid structure 60 of the same stainless steel alloy and that has internal cylindrical interface surface 62 in which is formed annular recess 64. Passage 66 extends radially from recess 64 to coupling surface 32 at port 68. Recesses 52 and 64 cooperate to define an annular chamber 70 of cross sectional area that is substantially the same as that of the coupled inlet tubular 22 so that the fluid velocity through chamber 70 is about one half the fluid velocity in the inlet tubular 22 and through passage 66 (the fluid flow dividing into two paths in chamber 70).

Disposed on either side of chamber 70 is an annular seal chamber 72 in which a hybrid seal ring assembly 74 is disposed. Outwardly of each chamber 72 is a bearing chamber 76 in which annular ring bearing 78 is disposed. Forming portions of the walls of seal chamber 72 and bearing chamber 76 is retainer ring 80 that is secured to mandrel 34 by bolts 82. The outer surface 84 (FIG. 3) of retainer ring 80 projects slightly above the adjacent surfaces of mandrel 34 and toroid 60 so that when the swivel module assemblies 30 are stacked (as shown in FIG. 1), dead air spaces between the stacked mandrels 34 minimize heat flow between the modules 30, hence minimizing temperature gradients between individual mandrels.

Further details of the seal and bearing structures may be seen with reference to FIG. 4. Disposed in each annular seal chamber 72 is a hybrid seal ring assembly 74 that includes steel seal ring 90 that has a diameter of about 0.9 meter, a height of about seven centimeters, and a cross sectional width of about two and one half centimeters. One corner of ring 90 is defined by orthogonal surfaces 92a, 92b, each of which is faced with Tribaloy (a cobalt, molybdenum, chrome alloy). Disposed in the recess 94 adjacent each surface 92 is a soft, C-section, reinforced teflon seal 96 with spaced lips 98 between which biasing spring ring 100 is disposed. Each ring 90 also has an annular recess 102 below recess 94b, and an inclined surface 104 at the corner of ring 90 opposite seal surfaces 92 (see also FIGS. 5a and 5b).

Formed in interface surface 62 of toroid 60 is a recess which provides radial surface 106 and cylindrical surface 108 that define respectively the base and outer surfaces of seal chamber 72. Mandrel interface surface 50 defines the inner surface of seal chamber 72, and surface 112 of retainer ring lip 110 defines the cap surface of seal chamber 72. The end of seal chamber surface 108 and retainer ring flange surface 112 are faced with stellite (a cobalt, chromium, tungsten alloy). Antirotation lugs 114 on seal ring 90 engage slots in toroid seal chamber wall 108 of toroid 60 so that seal ring 90 turns with but is allowed to move axially relative to toroid 60.

Seated on seal chamber surface 106 and extending across the gap between interface surfaces 50 and 62 at the base of seal chamber 72 is high pressure reinforced teflon seal ring 116. Wave spring 118 that is disposed between reaction ring 116 and seal ring surface 104 initially seats reaction ring 116 in its proper chamber sealing position and urges seal surfaces 92 against the stellite faced surfaces 108, 112 of toroid 60 and retainer ring 80. Recess 120 above retainer ring flange 110 receives C-section static (reinforced teflon) seal 122; a similar C-section seal 124 is disposed in recess 126 at the inner boundary of bearing chamber 76 between retainer ring 80 and toroid 60; and a dual C-section seal 128 is disposed at the outer boundary of chamber 76 between ring 80 and toroid 60.

Disposed in bearing chamber 76 is bearing ring 78 of polyimide (Vespel) that has a mean diameter of about 0.9 meter and cross sectional dimensions of about three centimeters by three centimers. A series of grooves 130 in the outer face of bearing ring 78 allow distribution of grease throughout bearing chamber 76, and the low pressure bearing chamber seals 124, 128 prevent leakage and wash out of grease as well as preventing intrusion of dirt into the bearing cavity 76. Bearing ring 78 has a clearance of about one millimeter to allow for differential thermal expansion. Grease passage 140 extends through toroid 60 from nipple 142 to bearing chamber 76 to permit grease to be packed into the bearing cavity through filling nipple 142. A vent passage 144 extends from the chamber 120 below seal 124.

A system for pressurizing seal chamber 72 with buffer fluid includes reservoir cylinder 150 that is filled with buffer fluid (grease) 152 and houses free piston 154. Reservoir fitting 156 is connected via line 158 and toroid passage 160 to seal chamber 72 while reservoir cylinder fitting 162 is connected via line 164 and toroid passage 166 to flow path chamber 70. Each seal chamber 72 thus is pressurized by the buffer fluid 152 to the process stream pressure in chamber 70. Any small leakage of fluid (drops-per-hour scale weeping) across high pressure seal 116 is compensated by additional inflow from reservoir 150 so that seal 116 is pressure balanced and insures against random intrusion of contaminants into seal chamber 72 through the gap between interface surfaces 50 and 62.

FIGS. 5a and 5b illustrate diagrammatically the loading and deflection of seal ring 90. The pressure fluid distribution around ring 90, as shown in FIG. 5a, seats seal ring surfaces 92 so that the interface sealing pressure in the sealing regions of ring surfaces 92 drops across compliant seal surfaces 96 from the process pressure ($P_f$) to the ambient pressure at the harder seal surfaces 92. As a result of this pressure distribution, ring 90 is subjected to an axial force ($F_a$), a radial force ($F_r$) and the moment inducing conicity ($M_c$) as indicated in FIG. 5b. Ring 90 moves axially and expands under this loading to take up any local axial or radial circumferential clearances and establishes firm contact of ring seal surfaces 92 and 96 around their entire sealing peripheries. Ring 90 will execute any small radial or axial motion necessary (due to bearing play or differential thermal expansion, for example), to maintain surfaces 92 and 96 in engagement with the toroid surfaces 108 and retainer surfaces 112 around the entire sealing periphery. In order that ring 90 may carry out these radial and axial motions freely, the ring is relatively thin and compliant (as a hoop), and the material pair of surfaces 92, 108 and 112 is chosen such that the harder (Stellite) face is on the retainer ring surface 112 and toroid surface 108 and the slightly softer (Tribaloy) face is on surfaces 92, the material pair having excellent sliding characteristics so that grooves will not be worn in ring 80 or toroid 60, and wear of the Tribaloy surfaces will be relatively low.

Each of the two reinforced Teflon lip seals 96 is in series with a metal seal surface 92 such that the seal surfaces 92 act as anti-extrusion barriers and virtually eliminate distortion of the softer seals, the softer compliant seals 96 undergoing sliding movement without cyclical compression or bending, thus eliminating flexual fatigue. Corner surfaces 92 of metal ring 90 always firmly seat against toroid and retainer ring surfaces 108, 112 under the action of the pressurized buffer fluid 152. Bearing ring and differential thermal expansion do not affect the seating capabilities of the seal surfaces 92, 96. Further, the buffer fluid 152 in seal chamber 72 transmits pressure so that reaction seal 116 is pressure balanced and contact between the process stream flow path in chamber 70 and the high pressure seals 92, 96 at the opposite side of the seal chamber 72 is prevented so that those seals are maintained in a clean environment.

Further details of the expansion joint subassembly 20 may be seen with reference to FIG. 6. Each tubular 22 is secured at its upper end to a corresponding mandrel 34, as indicated in FIGS. 1 and 3. The lower end of each tubular is closed with a threaded cap 26 and is received in lantern ring assembly 24 that is secured in inlet structure 14 by ring 172. Each lantern ring assembly has a central cylindrical web 174 with port 176 that is aligned with port 178 in tubular 22. At the upper end of cylindrical web 174 is a flange ring 180 against which is seated teflon soft seals 182, 184; and at the lower end of ring web 174 is flange ring 186 against which are seated teflon soft seals 188, 190. The soft seals 182, 184, 188, 190 are in a state of hydrostatic stress that does not exceed the maximum system pressure (5,000 psi) and the lantern ring assembly 24 is pressure balanced and does not transmit force. This expansion joint subassembly allows the tubulars 22 to grow freely when heated, thus eliminating thermal loading due to pipe expansion. As the expansion joint subassemblies are mounted below plate 12, individual expansion joints can be replaced without disturbing the swivel modules 30. In this swivel system, thermal stress due to hot product flow is small, each tubular 22 being fixed at its upper end free to expand downward. The dead air spaces around the tubulars 22 and between the mandrels 34 minimize temperature gradients within individual swivel modules 30.

Field replacement of a malfunctioning swivel module may be carried out by unfastening the involved inlet and outlet piping and the tie bolts 44; removing the malfunctioning swivel module; replacing it with another swivel module; and then refastening the piping and tie bolts 44. The critical dynamic seals are preinstalled and only the common static seals (in threaded and flanged joints) are assembled in the field. The only major replacement item to be stocked is the swivel module (in two sizes in this embodiment, one for each of the two sets of pipe diameters); and the maximum weight and size to be handled in the field at any one time is that of a single swivel module.

While a particular embodiment of the invention has been shown and described, various modifications will be apparent to those skilled in the art, and therefore it is not intended that the invention be limited to the disclosed embodiment or to details thereof, and departures may be made therefrom within the spirit and scope of the invention.

What is claimed is:

1. A flow system comprising two relatively movable structures that in part define a flow path, said relatively movable structures having juxtaposed interface surfaces in which ports are defined through which said flow path extends,
    structure defining an annular seal chamber between said interface surfaces adjacent said flow path,
    annular hybrid seal ring structure in said seal chamber, said hybrid seal ring structure including a metal ring having a first metal sealing surface for engaging a seal chamber defining surface adjacent said interface surfaces of one of said relatively movable structures, a second metal sealing surface adjacent said first metal sealing surface for engaging a seal chamber defining surface adjacent said interface surface of the second of said relatively movable structures, said metal sealing surfaces of said hybrid seal ring structure being orthogonally disposed and contiguous with one another and defining one corner of said ring, and
    supplemental seal material of more compliant material than the first and second metal sealing surfaces of the seal ring structure as a generally linear extension of each said metal sealing surface, the length of each said generally linear supplemental surface seal being greater than the length of its adjacent metal seal surface, and
    pressure equalizing means for maintaining the pressure in the seal chamber at substantially the same pressure as in said flow path and said hybrid seal ring structure being arranged so that the pressure in said seal chamber acts to radially expand said metal ring and urge the sealing surfaces of said hybrid seal ring structure into sealing engagement with the cooperating seal chamber defining surfaces of said two relatively movable flow path defining structures.

2. The flow system of claim 1 wherein said pressure equalizing means includes means coupled between said flow path and said seal chamber for pressurizing said seal chamber to seat said seal ring sealing surfaces against said seal chamber surfaces to seal the interface between said relatively movable structures.

3. The flow system of claim 1 and further including resilient means urging said sealing surfaces of said seal ring structure into sealing engagement with said cooperating seal chamber defining surfaces.

4. The flow system of claim 1 wherein the main sealing surfaces of said seal ring structure are metallic and each said supplemental seal material of more compliant material is a seal member of the C-section type.

5. The flow system of claim 4 wherein each said supplemental seal member includes a spring biasing member urging said more compliant material against a surface of said seal chamber.

6. The flow system of claim 1 wherein said first and second sealing surfaces of said seal ring structure each has a hardness of at least about 50 Rockwell$_c$ and each said supplemental seal material has a hardness of less than about 90 Rockwell$_H$.

7. The flow system of claim 1 and further including slider bearing structure supporting said two relatively movable structures, said bearing structure being located so that said seal chamber is between said bearing structure and said flow path.

8. The flow system of claim 7 wherein said slider bearing structure includes polymeric material.

9. A flow system comprising two relatively movable structures that in part define a flow path, said relatively movable structures having juxtaposed interface surfaces in which ports are defined through which said flow path extends,
    structure defining an annular seal chamber between said interface surfaces adjacent said flow path, first annular seal ring structure in said seal chamber, said first annular seal ring structure having a first sealing surface for engaging a seal chamber defining surface adjacent said interface surface of one of said relatively movable structures, a second sealing surface adjacent said first sealing surface for engaging a seal chamber defining surface adjacent said interface surface of the second of said relatively movable structures, and supplemental seal material of more compliant material than the first and second sealing surfaces of the seal ring structure as an extension of each said sealing surface,
    second annular seal ring structure in said seal chamber, said second annular seal ring structure having sealing surfaces for engaging seal chamber defining surfaces adjacent said interface surfaces of said relatively movable structures that are proximate to said flow path so that said second annular seal ring structure insures against random intrusion of contaminants into said seal chamber between said interface surfaces of said relatively movable structures, and
    pressure equalizing means for maintaining the pressure in the seal chamber at substantially the same pressure as in said flow path and said seal ring structure being arranged so that the pressure in said seal chamber acts to urge the sealing surface of said seal ring structure into sealing engagement with the cooperating seal chamber defining surfaces of said two relatively movable flow path defining structures.

10. The flow system of claim 9 and further including resilient structure between said first and second annular seal ring structures in said seal chamber that is effective to bias the sealing surfaces of said first seal ring structure into sealing engagement with said cooperating seal chamber defining surfaces.

11. A flow system comprising two relatively movable structures that in part define a flow path, said relatively movable structures having juxtaposed interface surfaces in which ports are defined through which said flow path extends, structure defining an annular seal chamber between said interface surfaces adjacent said flow path, first annular seal ring structure in said seal chamber, said first annular said ring structure having a first sealing surface for engaging a seal chamber defining surface adjacent said interface surface of one of said relatively movable structures, a second sealing surface adjacent said first sealing surface for engaging a seal chamber defining surface adjacent said interface surface of the second of said relatively movable structures, the material pair of each of said sealing surfaces of said annular seal ring structure and the engaged surface of said seal chamber defining surface being such that the harder material is on the steel chamber defining surface and the softer material is on said sealing surfaces of said annular seal ring structure, the material pair having sliding characteristics so that wear of the softer seal ring surfaces will be relatively low, and supplement seal material of more compliant material than the first and second sealing surfaces of the seal ring structure as an extension of said said sealing surface, and pressure equalizing means for maintaining the pressure in the seal chamber at substantially the same pressure as in said flow path and said seal ring structure being arranged so that the pressure in said seal chamber acts to urge the sealing surfaces of said seal ring structure into sealing engagement with the cooperating seal chamber defining surfaces of said two relatively movable flow path defining structures.

12. A flow system comprising two relatively movable structures that in part define a flow path, said relatively movable structures having juxtaposed interface surfaces in which ports are defined through which said flow path extends, structure defining an annular seal chamber between said interface surfaces adjacent said flow path, first annular seal ring structure in said seal chamber, said first annular seal ring structure having a first sealing surface for engaging a seal chamber defining surface adjacent said interface surface of one of said relatively movable structures, a second sealing surface adjacent said first sealing surface for engaging a seal chamber defining surface adjacent said interface surface of the second of said relatively movable structures, and supplemental seal material of more compliant material than the first and second sealing surfaces of the seal ring structure as an extension of each said sealing surface, said annular seal ring structure and one of said two relatively movable structures having cooperating anti-rotation lug and slot structure so that said seal ring turns with said one relatively movable structure, and pressure equalizing means for maintaining the pressure in the seal chamber at substantially the same pressure as in said flow path and said seal ring structure being arranged so that the pressure in said seal chamber acts to urge the sealing surfaces of said seal ring structure into sealing engagement with the cooperating seal chamber defining surfaces of said two relatively movable flow path defining structures.

13. A fluid swivel system of the type suitable for use with a single point mooring system and the like comprising mandrel structure having a coupling for connection to a flow conduit, an outer cylindrical interface surface, a port in said outer interface surface, and defining a through flow path from said coupling to said port, generally toroidal structure surrounding and mounted for rotation relative to said mandrel structure, said toroid structure having an inner cylindrical interface surface in juxtaposed relation to said interface surface of said mandrel structure and defining a through flow path from a port in said inner interface surface to a port in an external surface, said mandrel and toroid structures cooperating to define a through flow passage between said mandrel coupling and said toroid port in said external surface and further cooperating to define an annular seal chamber between the juxtaposed interface surfaces on either side of said through passage, hybrid annular seal ring structure in each seal chamber, each said hybrid annular seal ring structure including a relatively thin and compliant metal ring having first and second sealing surfaces for engaging corresponding seal chamber defining surfaces of said mandrel and toroid structures respectively, and each sealing surface having relatively hard and soft portions, said sealing surfaces of said hybrid seal ring structure being orthogonally disposed, pressure equalizing means coupled between said through flow passage of said swivel and each said seal chamber for maintaining the pressure in said seal chambers substantially at the same pressure as in said through flow passage to radially expand said metal ring and urge the sealing surfaces of said sealing ring structures into sealing engagement with the seal chamber defining surfaces of said mandrel and toroid structures, second annular seal ring structure in each said seal chamber, each said second annular seal ring structure having sealing surfaces for engaging seal chamber defining surfaces adjacent said interface surfaces of said relatively rotatable mandrel and toroid structures that are proximate to said flow path so that said second annular seal ring structure is pressure balanced and insures against random intrusion of contaminants into said seal chamber between said interface surfaces of said mandrel and toroid structures, and bearing structure between said mandrel and toroid structures for permitting rotation of said toroid structure relative to said mandrel structure, said bearing structure being located so that each said seal chamber is between an adjacent bearing structure and said through passage.

14. The swivel system of claim 13 wherein the main sealing surfaces of each said hybrid seal ring structure are metallic and each said supplemental seal material of more compliant material is a seal member of the C-section type that has a sealing surface aligned with an immediately adjacent main metallic sealing suface.

15. The swivel system of claim 13 wherein said pressure equalizing means includes grease filled cylinder means coupled between said flow path and said seal chamber for pressurizing said seal chamber to seat said hybrid seal ring sealing surfaces against said seal chamber surfaces to seal the interface between said relatively rotatable mandrel and toroid structures.

16. The swivel system of claim 13 and further including conduit structure having an upper end secured to said mandrel structure and a lower end disposed in expansion joint structure so that said conduit structure is allowed to grow freely when heated, thus reducing thermal loading when said conduit is heated.

17. A swivel system comprising a plurality of swivel modules as claimed in claim 16 wherein said plurality of swivel modules are in stacked relation, each said mandrel has a said conduit structure secured to it, said conduit structures pass through lower mandrel structures in the stack and there is air space between said mandrels and between each said conduit structure and said lower mandrel structures so that temperature gradients within said swivel modules are minimized.

18. A fluid system of the type suitable for use with a single point mooring system and the like comprising
    mandrel structure having a coupling for connection to a flow conduit, an outer cylindrical interface surface, a port in said outer interface surface, and defining a through flow path from said coupling to said port,
    generally toroidal structure surrounding and mounted for rotation relative to said mandrel structure, said toroid structure having an inner cylindrical interface surface in juxtaposed relation to said interface surface of said mandrel structure and defining a through flow path from a port in said inner interface surface to a port in an external surface,
    said mandrel and toroid structures cooperating to define a through flow passage between said mandrel coupling and said toroid port in said external surface and further cooperating to define an annular seal chamber between the juxtaposed interface surfaces on either side of said through passage,
    seal ring structure in each seal chamber, each said seal ring structure having first and second sealing surfaces for engaging corresponding seal chamber defining surfaces of said mandrel and toroid structures respectively, and each sealing surface having relatively hard and soft portions,
    pressure equalizing means coupled between said through flow passage of said swivel and each said seal chamber for maintaining the pressure in said seal chambers substantially at the same pressure as in said through flow passage to urge the sealing surfaces of said sealing ring structures into sealing engagement with the seal chamber defining surfaces of said mandrel and toroid structures,
    second annular seal ring structure in each said seal chamber, each said second annular seal ring structure having sealing surfaces for engaging seal chamber defining surfaces adjacent said interface surfaces of said relatively rotatable mandrel and toroid structures that are proximate to said flow path so that said second annular seal ring structure is pressure balanced and insures against random intrusion of contaminatns into said seal chamber between said interface surfaces of said mandrel and toroid structures, and
    bearing structure between said mandrel and toroid structures for permitting rotation of said toroid structure relative to said mandrel structure, said bearing structure being located so that each said seal chamber is between an adjacent bearing structure and said through passage.

19. The swivel system of claim 18 and further including resilient biasing structure between said first and second annular seal ring structures in each said seal chamber that is effective to bias the sealing surfaces of said first seal ring structure into sealing engagement with said cooperating seal chamber defining surfaces.

20. A fluid system of the type suitable for use with a single point mooring system and the like comprising
    mandrel structure having a coupling for connection to a flow conduit, an outer cylindrical interface surface, a port in said outer interface surface, and defining a through flow path from said coupling to said port,
    generally toroidal structure surrounding and mounted for rotation relative to said mandrel structure, said toroid structure having an inner cylindrical interface surface in juxtaposed relation to said interface surface of said mandrel structure and defining a through flow path from a port in said inner interface surface to a port in an external surface,
    said mandrel and toroid structures cooperating to define a through flow passage between said mandrel coupling and said toroid port in said external surface and further cooperating to define an annular seal chamber between the juxtaposed interface surfaces on either side of said through passage,
    seal ring structure in each seal chamber, each said seal ring structure having first and second sealing surfaces for engaging corresponding seal chamber defining surfaces of said mandrel and toroid structures respectively, and each sealing surface having a relatively hard metallic main sealing surface portion and a relatively soft supplemental seal member of the C. section type that has a sealing surface alligned with an immediately adjacent main metallic sealing surface, the material pair of each of said metallic sealing surfaces of said annular seal ring structure and the engaged surface of said seal chamber defining surface being such that the harder material is on the seal chamber defining surface and the softer material is on said sealing surfaces of said annular seal ring structure, the material pair having sliding characteristics so that wear of the softer seal ring surfaces will be relatively low,
    pressure equalizing means coupling between said through flow passage of said swivel and each said seal chamber for maintaining the pressure in said seal chambers substantially at the same pressure as in said through flow passage to urge the sealing surfaces of said sealing ring structures into sealing engagement with the seal chamber defining surfaces of said mandrel and toroid structures,
    bearing structure between said mandrel and toroid structures for permitting rotation of said toroid structure relative to said mandrel structure, said bearing structure being located so that each said seal chamber is between an adjacent bearing structure and said through passage.

21. The swivel system of claim 13 wherein said bearing structure includes a slider bearing ring member of polymeric material.

22. A fluid system of the type suitable for use with a single point mooring system and the like comprising mandrel structure having a coupling for connection to a flow conduit, an outer cylindrical interface surface, a port in said outer interface surface, and defining a through flow path from said coupling to said port, generally toroidal structure surrounding and mounted for rotation relative to said mandrel structure, said toroid structure having an inner cylindrical interface surface in juxtaposed relation to said interface surface of said mandrel structure and defining a through flow path from a port in said inner interface surface to a port in an external surface, said mandrel and toroid structures cooperating to define a through flow passage between said mandrel coupling and said toroid port in said external surface and further cooperating to define an annular seal chamber between the juxtaposed interface surfaces on either side of said through passage, seal ring structure in each seal chamber, each said seal ring structure having first and second sealing surfaces for engaging corresponding seal chamber defining surfaces of said mandrel and toroid structures respectively, and each sealing surface having relatively hard and soft portions, each said annular seal ring structure and said toroid structure having cooperating anti-rotation lug and slot structure so that said seal ring turns with and is allowed to move axially relative to said toroid structure, pressure equalizing means coupled between said through flow passage of said swivel and each said seal chamber for maintaining the pressure in said seal chambers substantially at the same pressure as in said through flow passage to urge the sealing surfaces of said sealing ring structures into sealing engagement with the seal chamber defining surfaces of said mandrel and toroid structures, supplemental seal structure between the through passage and the seal chamber, and bearing structure between said mandrel and toroid structures for permitting rotation of said toroid structure relative to said mandrel structure, said bearing structure being located so that each said seal chamber is between an adjacent bearing structure and said through passage.

* * * * *

UNITED STATES PATENT AND TRADEMARK OFFICE
CERTIFICATE OF CORRECTION

PATENT NO. : 4,662,657
DATED : May 5, 1987
INVENTOR(S) : Andrew C. Harvey, et al.

It is certified that error appears in the above-identified patent and that said Letters Patent are hereby corrected as shown below:

Claim 11, line 9, "said" should be --seal-- (2nd occurrence)
line 20, "steel" should be --seal--;
line 27, "said" (first occurrance) should be --each--.

Claim 18, line 63, "contaminatns" should be --contaminants--.

Claim 20, line 50, "coupling" should be --coupled--.

Signed and Sealed this

Twenty-fifth Day of August, 1987

*Attest:*

DONALD J. QUIGG

*Attesting Officer*  Commissioner of Patents and Trademarks